Oct. 11, 1960 R. E. GRAHAM 2,956,157

MULTILEVEL QUANTIZER

Filed Nov. 21, 1956 2 Sheets-Sheet 1

INVENTOR
R. E. GRAHAM
BY Harry C. Hart
ATTORNEY

Oct. 11, 1960 R. E. GRAHAM 2,956,157

MULTILEVEL QUANTIZER

Filed Nov. 21, 1956 2 Sheets-Sheet 2

INVENTOR
R. E. GRAHAM
BY Harry C. Hart
ATTORNEY

United States Patent Office 2,956,157

Patented Oct. 11, 1960

2,956,157

MULTILEVEL QUANTIZER

Robert E. Graham, Chatham Township, Morris County, N.J., assignor to Bell Telephone Laboratories, Incorporated, New York, N.Y., a corporation of New York Filed Nov. 21, 1956, Ser. No. 623,732

6 Claims. (Cl. 328—14)

This invention relates to apparatus for converting a message signal having a continuous range of signal amplitudes into one having a finite number of discrete values, apparatus of this sort being generally known as signal quantizers. It has for its principal object so to improve the transfer characteristics of such apparatus at high frequencies that the output signal will approach as closely as possible a staircase wave form having essentially flat "treads."

In an application of B. M. Oliver, Serial No. 203,652, filed December 30, 1950, now patent 2,773,980, granted December 11, 1956, a circuit arrangement is described that is suitable for performing a quantizing operation. The quantizer disclosed therein employs an amplifier whose gain is a function of its cathode network impedance and in which a number of switching networks connected in the cathode circuit, each controlled by a particular control level voltage, are utilized to establish a plurality of conduction states of the amplifier. When the instantaneous amplitude of an input signal falls between a particular pair of control level voltages, a representative conduction state or output condition of the amplifier signifies the particular relation of the input signal amplitude to the predetermined control level. The conduction state of the amplifier is established according to this relationship.

It is evident that a quantizer employed to effect an analog to digital conversion, particularly at higher frequencies, should be as nearly ideal as possible. One of the characteristics of an ideal quantizer is that its transfer characteristic has zero transmission throughout each "tread" portion of the characteristic and infinite gain throughout the "riser" portion. However, in a quantizer of the type disclosed in the aforementioned Oliver application, imperfections in the cathode circuit give rise to undesirable grid-to-plate transmission components during the respective conduction states, which prevent realization of this goal. This transmission results primarily from the non-zero value of the quantizer cathode resistance at the riser transition points, the finite value of the cathode resistance throughout the tread portions, and also from capacitive loading throughout the tread portions, particularly at higher frequencies.

In a copending application of E. R. Kretzmer, Serial No. 623,733, filed November 21, 1956, now Patent No. 2,924,711, an improved multilevel quantizer is disclosed in which one of the objectionable grid-to-plate transmission components responsible for degradation of the tread portion is effectively cancelled out by means of a compensation signal applied to the quantizer output. The compensation signal is derived from the quantizer grid signal and chosen to be substantially equivalent to the value of the undesired transmission component and 180 degrees out of phase with that component. It is coupled to the quantizer output by means of a cathode follower amplifier, for example, to isolate the grid and prevent undue loading, and a resistive attenuation element which may be adjusted to the required value for complete cancellation.

It has been found, however, that at higher frequencies of operation, there is a second component of quantizer grid-to-plate transmission hindering the attainment of an idealized characteristic. This component results chiefly from the capacity associated with the individual switching circuit elements, the electron discharge device included in the quantizer circuit, and the necessary wiring of the circuit. Consequently, this component is approximately 90 degrees out of phase with the signal component appearing in the output. Moreover, the associated capacity increases progressively as the switching circuit elements are switched into the cathode circuit. Thus there is an undesirable nonlinear reactive transmission component added to the output signal which increases the slope of the tread portion of the characteristics.

The objectionable results above described are to a large extent overcome in the present invention by supplying to the quantizer output a signal related to the quantizer grid signal, this signal being chosen to be substantially equivalent to the negative value of the total of the undesired components. This virtually cancels out these components to yield a substantially improved signal characteristic having nearly zero slope throughout the tread portion of the staircase wave.

According to another feature of the invention, these various compensation components are coupled to the quantizer by means of a nonlinear coupling device so that the applied compensation more nearly follows the amplitude of the undesired components at any input signal amplitude.

The invention will be fully apprehended from the following detailed description taken in connection with the appended drawings in which.

Figure 1:
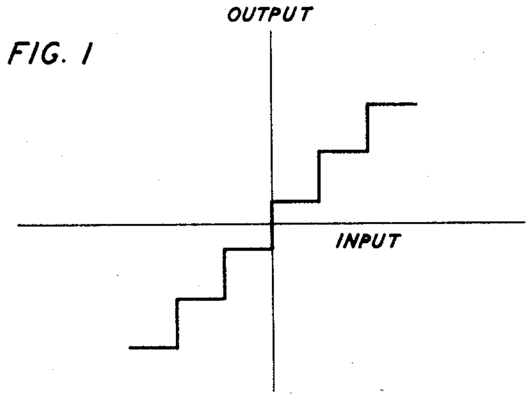
Fig. 1 is a graph showing the transfer characteristic of an ideal quantizer.

Referring now to the drawings, Fig. 1 is a graphical representation of the input-output response characteristic of an ideal quantizer having flat treads and vertical risers. As the input signal increases the output progresses stepwise such that the output is constant for a number of ranges of input values and exhibits infinite slope at the points between these constant ranges. It will be readily apparent that this type of response is characteristic of an amplifier having infinite gain for a finite number of input levels and having zero transmission for any other input value.

Figure 2:
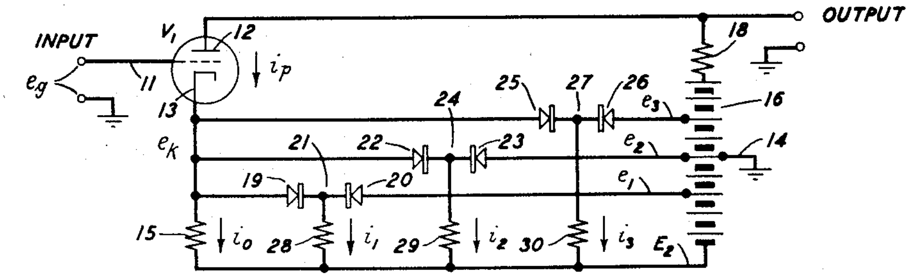
FIG. 2 (PRIOR ART)
Fig. 2 is a schematic diagram of the basic multilevel quantizer circuit of the type described in the aforementioned Oliver application.

An amplifier which has a response approaching this ideal is illustrated in Fig. 2, this circuit being fully described in the aforementioned Oliver application. In Fig. 2 the quantizer comprises a vacuum tube amplifier $V_1$ having a control grid 11, an anode 12 and a cathode 13. The anode-cathode circuit of the amplifier includes serially connected load impedance 18, a multilevel voltage source 16, and a cathode impedance 15. The circuit further includes a plurality of switching paths connected between the cathode 13 and intermediate points of reference potential $e_1$, $e_2$, and $e_3$ in source 16. The output signal is developed between the anode 12 and a reference ground potential point 14.

One of the switching paths comprises, for example, the serially connected asymmetrical conducting devices 19 and 20, connecting the cathode 13 to the reference potential point $e_1$. Devices 19 and 20 may be, for example, crystal diodes which have their like electrodes connected at a common junction point 21. This junction point is returned to the negative terminal of source 16 (designated voltage $E_2$) through the impedance 28. The other paths, including respectively devices 22, 23, and 25, 26 similarly connect the cathode 13 to progressively more positive reference potential points $e_2$ and $e_3$. The impedances 29 and 30 return respectively the junction points 24 and 27 to the common supply voltage $E_2$. Impedances 28, 29, and 30 may be of approximately the same magnitude as the cathode impedance 15. While only three switching paths are shown, it is obvious that the total number of such paths depends upon the desired number of discrete levels of conduction for the vacuum tube $V_1$. For the three paths illustrated, therefore, four conduction states or quantization levels are obtained.

Considering now the operation of the quantizer circuit of Fig. 2, assume that an input signal $e_g$, from any convenient source providing a signal having a continuous range of amplitudes, is applied to quantizer grid 11. Assume further that the signal has an initial potential value which is negative with respect to the level of the reference voltage $e_1$ and is progressively increased. The voltage $e_k$ of the cathode similarly increases while the current $i_0$ through the cathode impedance 15 changes rather slowly having a rate of change which depends on the total resistance of the external cathode circuit. It is assumed that the transconductance of the tube is high with respect to the external cathode conductances. Considering now the switching circuit including diodes 19 and 20, positive current assumed to have a value $i_1$ flows from the terminal $e_1$ of source 16 through diode 20 in the forward direction as indicated by the arrowhead, and through resistor 28 to the negative terminal of source 16. Since diode 20 has a low impedance to this current flow, junction point 21 has a potential substantially equal to that of reference voltage $e_1$. So long as $e_g$ is negative with respect to $e_1$, diode 19 is in its high impedance or low conduction state. With junction point 21 effectively isolated from the cathode $e_k$, current $i_1$ is supplied entirely from voltage tap $e_1$ through diode 20, while the plate current $i_p$ equals $i_0$, determined solely by the values of $e_k$ and resistance 15.

As voltage $e_g$ is further increased, the cathode potential $e_k$ increases also and a point is eventually reached at which the cathode voltage $e_k$ is equal to the reference potential $e_1$. Since this is also the potential of junction point 21, diode 19 now begins to conduct. When diodes 19 and 20 are both conducting, they form a low-resistance path between the cathode and tap $e_1$ on source 16, thereby giving the stage relatively high gain. Thus, as $e_k$ passes through the condition $e_k = e_1$, there is a sudden sharp transition or rise in the tube current, and current $i_1$ is now supplied from cathode 13 through diode 19, yielding a tube current $i_0 + i_1$. Since the value of the parallel combination of impedances 15 and 28 is still large compared to that of the series combination of devices 19 and 20 in their conductive states, there is again a relatively constant conduction state and there will be no further rapid change in the current flowing through impedance 18 so long as the level of the cathode voltage $e_k$ remains more positive than reference level $e_1$, and less than $e_2$.

With several such switching circuits connected between the cathode and the respective voltage points $e_1$, $e_2$ and $e_3$, it is evident that as $e_k$ exceeds the amplitude of each of these reference levels in turn, the respective diodes 22 and 25 will conduct thereby successively placing resistors 29 and 30 in parallel with the cathode impedance 15. Since each of these resistors has associated therewith a finite amount of stray capacity, the total capacity shunting the cathode circuit increases step-wise. The net current $i_p$ will be equal, in turn, to the sum of the current $i_0$, and currents $i_1$, $i_2$, and eventually $i_3$, plus the undesirable transmission components described above. Such a process of adding one component of current as each reference level is reached continues until the highest level has been exceeded. Hence, each separate level of conduction represents one quantum value of the input signal $e_g$ and the output is substantially a representation of the continuous range of input signal values expressed as a finite number of discrete levels or steps.

Figure 3:
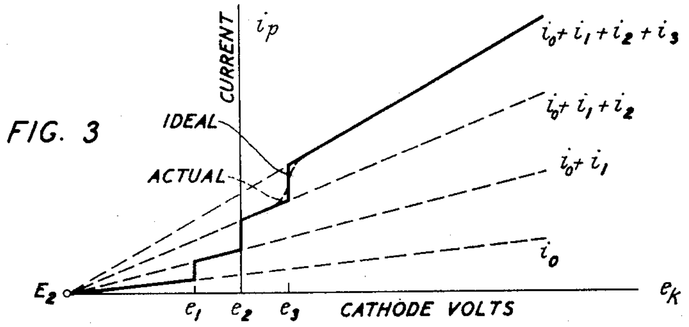
Fig. 3 is a graphic representation of the transfer characteristic of the quantizer of Fig. 2.

In Fig. 3 the above-described conditions are represented in graphic form. In this graph the abscissa represents the cathode voltage of the quantizer while the ordinate represents plate current. The voltage level of the cathode signal $e_k$ is shown increasing to the right from a voltage $E_2$ representing the negative reference potential of source 16. The reference level voltages $e_1$, $e_2$ and $e_3$ are located at points along the abscissa. The anode current $i_p$ is represented by the solid line portion of the characteristic and the several dashed line curves represent the current $i_0$ flowing through the cathode impedance 15, and the sum of $i_0$ and the currents flowing in the various switching paths. For example, in the region in which $e_k$ is less than $e_1$, the anode current is equal to $i_0$, and in the regions in which $e_k$ is between $e_1$ and $e_2$, the anode current is equal to the sum of $i_0$ and $i_1$. Although the ideal transition, occurring during the periods at which $e_k$ is substantially equal to the respective reference level voltages, is a sharp rise having infinite slope, the actual transition with rounded corners, shown as a dashed line results primarily because of the non-zero value of the cathode impedance during the transition time. This, in turn, is due in part from the finite forward impedance of the diode elements, and in part from the finite transconductance of $V_1$.

During operation at higher frequencies, the non-zero slope of each tread results from undesirable grid-to-plate transmission components, one resulting from the insufficiently high value of quantizer cathode resistance between switching states, and another resulting from capacitive loading of the cathode circuit. This slope would be zero only if the quantizer cathode resistor as well as all of the diode shunt resistances were infinite in value, and the cathode capacity was zero. However, as the successive switching circuits are connected to the cathode, the capacity associated with the cathode progressively increases also and, consequently, the slope of $i_p$ progressively increases making successive treads progressively steeper.

This latter effect, that is, the progressive increase in shunting capacity due to additional switching elements being cut into the circuit, may be to some extent improved by returning the diode junctions alternately to positive and negative supply voltages (the diodes being poled in the reverse direction when returned to a positive voltage point), so that the shunting resistors are alternately connected and disconnected from the cathode resistor. By this means the total shunting capacity can be made to remain substantially constant. Of course, capacitive shunting is still present and, as the frequency is increased, the resulting loading becomes more serious.

It is evident that an improvement of both the tread and riser portions of the characteristic at higher frequencies presents conflicting demands on the quantizer anode-cathode circuit. A sharp riser, one having extremely high slope, requires a low cathode impedance at the riser transition points. On the other hand, the tread should have substantially zero slope. This occurs only when the cathode impedance is very high and the effect of capacitive loading is minimized.

Figure 4:
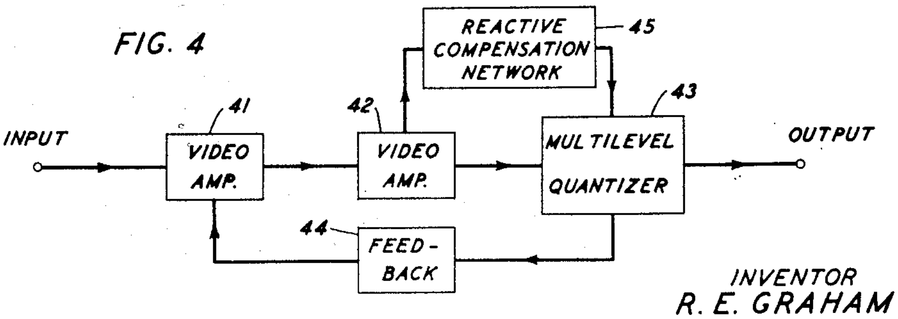
Fig. 4 is a block diagram illustrating a multilevel quantizer in accordance with the invention.

The present invention makes it both feasible and economical to overcome each of these conflicting demands and at the same time to overcome capacitive effects at higher frequencies. Accordingly, Fig. 4 is a block diagram of a simplified quantizer circuit embodying the invention. In the drawing an input signal from a conventional signal source, for example, a video signal source, is applied to the video amplifier 41 and in turn to video amplifier 42. These amplifiers, which may be of any well-known type are used to amplify the video input signal in order to supply a signal of adequate amplitude level to drive multilevel quantizer 43.

In accordance with the invention, both of the above-mentioned undesirable grid-to-plate transmission components are cancelled out by additionally applying a portion of the input signal from amplifier 42 to the quantizer 43 by means of a reactive compensation network 45. The phase and amplitude of each component of the compensation signal derived from the network is properly adjusted to make the cancelling transmission component just equal to the negative of the undesired component. Thus, the component resulting from the capacitive loading of the quantizer circuit is cancelled out by applying to the quantizer a compensation signal substantially equal in amplitude to, and 180 degrees out of phase with this reactive grid-to-plate component. Hence, this component lags the output signal by approximately 90 degrees for complete cancellation. In effect, this component is selected to be proportioned to the negative of the derivative of the input signal. It is within the scope of the invention to employ any well-known means for achieving the required phase shift.

The second grid-to-plate transmission component, i.e., the one in phase with the output signal resulting from the insufficiently high value of cathode resistance during the tread portion of the characteristic, is cancelled out by means of a compensating signal derived from network 45, and properly adjusted in both phase and amplitude, to make the cancelling transmission component just equal to the negative of this component. A 180 degree phase reversal in the compensation network 45 is used for this.

Additionally, more nearly perfect compensation is achieved by controlling the amplitude of each of these compensation components to accommodate changes which occur in both the shunting resistance and shunting capacitance throughout the tread portion as a result of variation of signal level. This is accomplished in the present invention by coupling each of the compensation components to the quantizer output through a nonlinear device. Such a device, which may form a part of compensation network 45, comprises, for example, a simple diode network.

By means of negative feedback applied, via element 44, from quantizer 43 to amplifier 41, the insufficient slope of the vertical risers resulting from the low transconductance of $V_1$ is substantially reduced. As a result, the effective quantizer cathode source impedance is very low, the cathode follows the input signal faithfully, and the riser portion of the characteristic is accordingly very steep.

Figure 5:
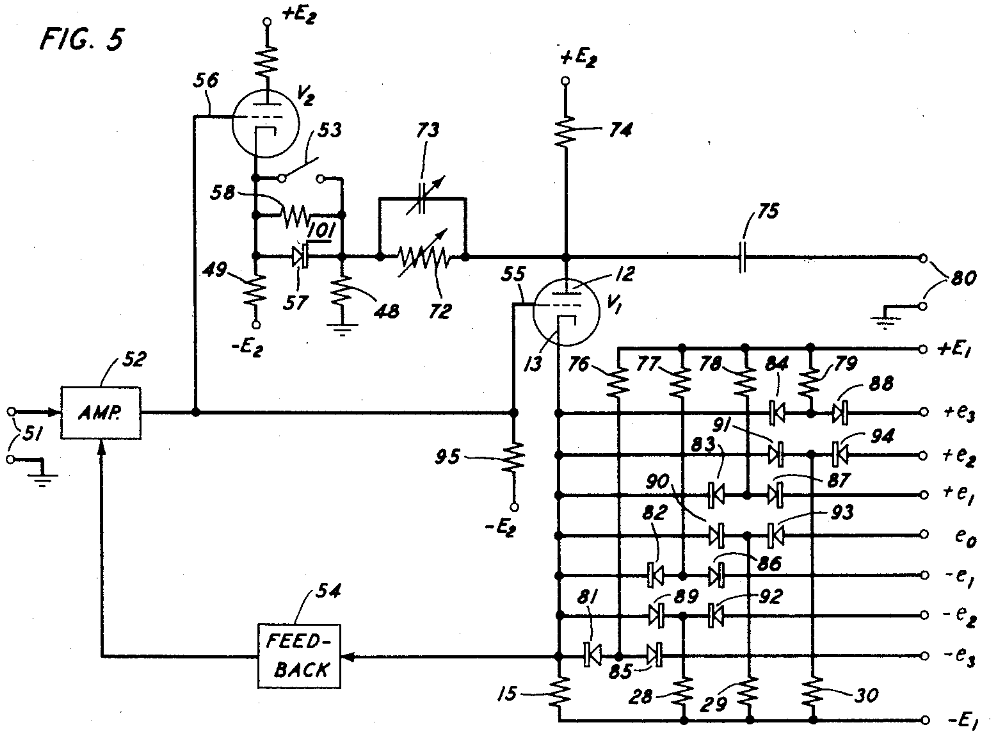
Fig. 5 is a schematic circuit diagram illustrating the details of one embodiment of the improved multilevel quantizer of the invention.

Fig. 5 illustrates in schematic diagram fashion an embodiment of the invention particularly suitable for use in a quantizer having a relatively constant total shunting capacity. As mentioned above, this can be achieved by means of a switching arrangement in which the several cathode shunting resistors (and the capacity associated with each) are alternately connected to and disconnected from the circuit as the signal amplitude is progressively increased. In Fig. 5 an input signal applied to input terminal points 51 is amplified in amplifier 52 and subsequently applied to the grid 55 of the quantizer circuit which includes amplifier $V_1$, and to the grid 56 of the cathode follower $V_2$ forming a part of the compensation network. The anode 12 of the amplifier $V_1$ is connected by means of resistor 74 to a source of positive potential $+E_2$, and by way of coupling capacitor 75 to the output terminal points 80. Cathode resistor 15, connected between cathode 13 and a negative reference potential $-E_1$, is initially shunted by resistors 76 through 79 connected between cathode 13 and potential $+E_1$ by means of diodes 81 through 84, these diodes being initially in their low impedance state. As the signal appearing at the grid 55 is progressively increased, the diodes 81 through 84 progressively change to their high impedance state thereby successively disconnecting these resistors from cathode 13. Diodes 89 through 91 similarly shift from their high impedance state to their low impedance state so as to connect the resistors 28, 29 and 30 in shunt with cathode resistor 15. The alternate switching networks, as described more fully in the Oliver application, are returned to reference levels $+E_1$ and $-E_1$, these voltages being chosen to be relatively large, and the shunting impedances 28 through 30, and 76 through 79 are chosen to be of relatively high value. Consequently, the total shunt resistance and also the total shunt capacity remain more nearly constant as the amplifier changes its conduction states than in the quantizer illustrated in Fig. 2.

Returning now to Fig. 5, the signal derived from amplifier 52 is applied to the grid 56 of cathode follower amplifier $V_2$. In well-known cathode follower fashion, a signal is developed across the resistor 49 connecting the cathode of $V_2$ to the negative potential $-E_2$. This signal, in phase with the one appearing at grid 55 and hence 180 degrees out of phase with the signal appearing at anode 12 of $V_1$, is fed by way of the parallel connected resistor 72 and capacitor 73 to the anode 12 of quantizer $V_1$. Inasmuch as both the total shunt resistance and total shunt capacity remain relatively constant in a quantizer employing a cathode network of the type shown in Fig. 5, the switch 53 connected across network 101 will normally be closed, i.e., the network 101 shorted out. Nevertheless, the nonlinear network 101, to be described more fully hereinafter, is provided so that any remaining shunt components may be completely balanced out.

Thus a signal in phase with the one appearing at the grid 55 of quantizer $V_1$ is coupled by means of resistor 72 to anode 12 of quantizer $V_1$. This signal is 180 degrees out of phase with the output signal as initially required. Resistor 72 is selected to be approximately equal in value to the average value of the shunting impedances in the cathode circuit of the quantizer stage, this being the value required to make the compensation transmission component substantially equal to the negative of the undesired transmission. An adjustable resistor may be employed to permit subsequent adjustment of the value of the compensation transmission component.

Similarly, a component of the signal developed at the cathode of $V_2$ is coupled by means of adjustable capacitor 73 to the anode of $V_1$. Capacitor 73 is adjusted to be approximately equal to the total stray capacity of the cathode circuit. The current supplied thereby leads the input signal by 90 degrees, and thus cancels the component of output current due to capacitive cathode shunting.

As pointed out above, under certain circumstances, the total shunting capacity and resistance associated with the balanced switching network in the cathode of $V_1$ may not be maintained constant. In such a case the nonlinear network 101 is used to produce the proper tracking. Network 101, in one of its simplest forms, comprises the series combination of diode 57 and resistor 48. The diode may be shunted by a resistor 58. Although the diode is shown having its anode connected to the cathode of $V_2$, it may have its polarity reversed if desired. Moreover, a nonlinear network of any type well known may be employed. In operation the cathode follower $V_2$ operates as a low impedance source of signals and, as the signal produced at its cathode increases, the diode 57, which is initially in a high impedance state, gradually changes to its low impedance state thus causing the signal developed across resistor 48 to increase progressively in a nonlinear manner. As mentioned above, normally closed switch 53 is connected across the diode 57 so that the network 101 may be inserted when application of the compensation signal according to a nonlinear characteristic is required.

As described above, good switching performance requires a low cathode impedance. Accordingly, negative feedback is employed in the invention to achieve this. In Fig. 5 the feedback path is from the quantizer cathode 13 to the amplifier 52, and includes the network 54, which network preferably contains an isolation device such as a buffer amplifier. By this means, the output impedance of the amplifier $V_1$ is reduced by approximately 20 to 1 in the low and mid-frequency range. Hence, the periods of switching are of extremely short duration, and the quantizer is manifestly capable of switching between adjacent levels at an extremely fast rate.

Figure 6:
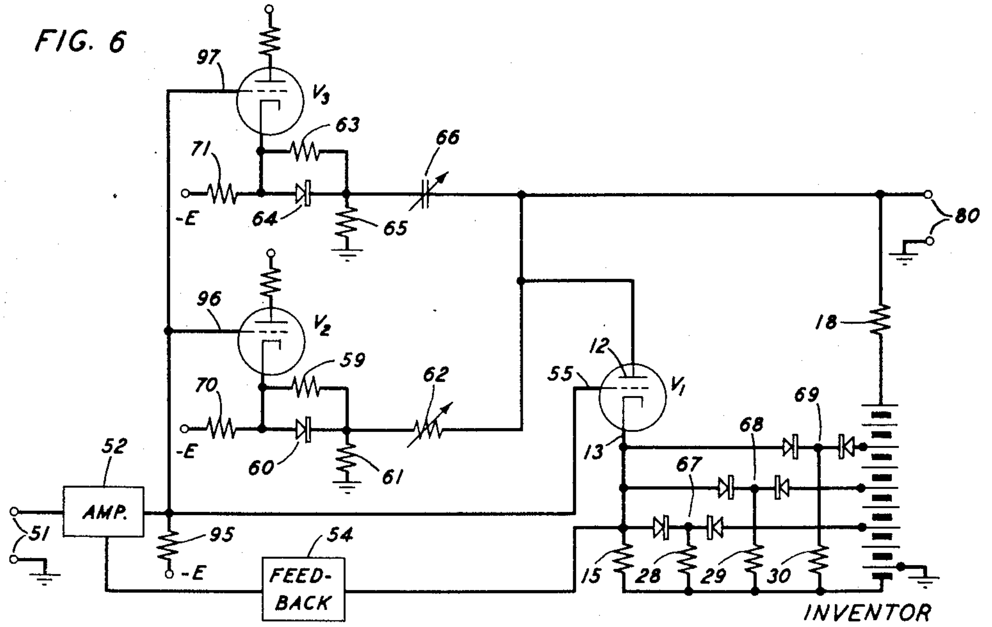
Fig. 6 is a s chematic circuit diagram showing an alternate form of the invention.

Fig. 6 illustrates a preferred embodiment of the invention particularly suitable for use with a quantizer of the type illustrated in Fig. 2. In such a quantizer successive resistors are connected by means of diode switching circuits across cathode resistor 15 and, as a result, the total stray capacity incrementally increases. This is due in part to the addition of the stray capacity associated with the resistors switched into the circuit, in part to the additional lead length, and in part to the stray capacity of the new diode added to the shunting path. Accordingly, one of the compensation signal components is chosen to be nonlinear with respect to the input signal characteristic so as to counteract the rise with signal level of the undesirable reactive component. Similarly, a second nonlinear component is produced to compensate for the undesirable in-phase component.

In Fig. 6 this is accomplished by simultaneously applying the input signal fed to the grid 55 of the amplifier $V_1$ to the grids 96 and 97 of cathode follower amplifiers $V_2$ and $V_3$, respectively. The signal developed across resistor 70, connecting the cathode of $V_2$ to a source of bias potential, is one in phase with the signal at grid 55 of $V_1$ and 180 degrees out of phase with the output signal on anode 12 of $V_1$. By means of the nonlinear network including diode 60, resistor 59, resistor 61, and the serially connected adjustable resistor 62, the signal is applied to the quantizer output. Resistor 62 is chosen to be relatively high in value with respect to resistor 61, and consequently the junction of diode 60 and resistor 61 is substantially at ground potential, bias for the diode being established by means of source −E acting through resistor 70. It will be seen, therefore, that the compensation signal component is in the nature of an out-of-phase current being injected into the anode circuit of $V_1$.

Similarly, a nonlinear network comprising resistors 63 and 65 and diode 64 is connected to the cathode of cathode follower amplifier $V_3$. Thus a nonlinear signal component is developed across resistor 65 and is coupled by means of adjustable capacitor 66 to the anode 12 of $V_1$. The resulting nonlinear signal component injected into the anode circuit of $V_1$ lags the in-phase component appearing at the anode by 90 degrees. The amplitude of this injected signal may be adjusted by means of capacitor 66.

The improved quantizer of Fig. 6, therefore, not only overcomes two of the primary deficiencies of quantizers employing diode switching networks, thereby materially improving the output staircase wave characteristic, but also compensates for the incremental increase in shunting capacity resulting from the various switching operations. Accordingly, the quantizer is manifestly suitable for handling present day information signals satisfactorily.

Although the nonlinear compensation network illustrated in Fig. 6 has been described in terms of separate cathode follower amplifiers, and separate nonlinear networks, it should be apparent that one or more of the elements may be included in a single circuit. For example, a circuit of the type illustrated in Fig. 5 may be employed if the nonlinear characteristic of both the in-phase and out-of-phase compensation components are the same. Similarly, other nonlinear network combinations and other feed methods may be used to provide, for example, voltage rather than current injecton.

In all events, it is to be understood that the above-described arrangements are illustrative of the application of the principles of the invention. Numerous other arrangements may be devised by those skilled in the art without departing from the spirit and scope of the invention.

What is claimed is:

1. A multilevel quantizing system comprising an amplification stage adapted to have applied thereto input message signals, a quantizing network connected in the output of said amplification stage, said quantizing network having an output connection, means connected between the output of said amplification stage and said output connection for applying to said output connection an in-phase component and an out-of-phase component of the signal derived from said amplification stage for compensation.

2. A multilevel quantizer according to claim 1 in which said means connected between the output of said amplification stage and said output connection comprises a buffer device and coupling means including a resistor and a capacitor.

3. Quantizing apparatus comprising in combination an input terminal adapted to receive a message signal to be quantized, an output terminal, a first amplifier connected between said input terminal and said output terminal having an anode, a cathode, and at least one control element, means connecting said input terminal to said control element, a plurality of switching networks connected to said first amplifier for respectively altering the gain of said first amplifier, said switching networks being responsive to the amplitude of said input signal, a cathode follower amplifier supplied with said input signals, and means including a resistive-capacitive network for applying the output of said cathode follower amplifier to said output terminal.

4. Quantizing apparatus according to claim 3 in which said means for applying the output of said cathode follower amplifier to said output terminal includes an adjustable capacitor.

5. A multilevel quantizer circuit comprising an amplifying element having a cathode, a control grid and an anode and having an output terminal connected thereto, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path including an impedance element for each of said switching paths, extending from the junction of said pair of asymmetrically-conducting devices to a point in said output circuit at a reference potential, means for applying an input message signal to said control grid, means including a resistor for introducing an inphase component of said input message signal to said output terminal, means including a nonlinear element for deriving from said input message signal an out-of-phase signal component proportional to the derivative of said input signal, and means for introducing said out-of-phase component of said input message signal to said output terminal.

6. Quantizing apparatus comprising in combination an input terminal adapted to receive a message signal to be quantized, an output terminal, a first amplifier connected between said input terminal and said output terminal having an anode, a cathode, and at least one control element, means connecting said input terminal to said control element, a plurality of switching networks connected to said first amplifier for respectively altering the gain of said first amplifier, said switching circuits being responsive to the amplitude of said input signal, a cathode follower amplifier supplied with said input signals, and means including a nonlinear network comprising the parallel combination of a resistor and an adjustable capacitor for applying the output of said cathode follower amplifier to said output terminal.

References Cited in the file of this patent

UNITED STATES PATENTS

| | | |
|---|---|---|
| 2,686,869 | Bedford | Aug. 17, 1954 |
| 2,701,303 | Wells | Feb. 1, 1955 |
| 2,725,530 | Schroeder | Nov. 29, 1955 |
| 2,733,410 | Goodall | Jan. 31, 1956 |
| 2,773,980 | Oliver | Dec. 11, 1956 |